UNITED STATES PATENT OFFICE.

JOSEPH E. KESELING AND CHARLES FUCHS, JR., OF NEW YORK, N. Y., ASSIGNORS TO THE PYROLITH COMPANY, OF NEW JERSEY.

COMPOSITION OF MATTER FOR THE MANUFACTURE OF ARTIFICIAL STONE.

SPECIFICATION forming part of Letters Patent No. 480,591, dated August 9, 1892.

Application filed April 30, 1892. Serial No. 431,340. (No specimens.)

*To all whom it may concern:*

Be it known that we JOSEPH E. KESELING, a subject of the Emperor of Germany, and CHARLES FUCHS, Jr., a citizen of the United States, residing at New York, county and State of New York, have invented certain new and useful Improvements in a Composition of Matter for the Manufacture of Artificial Stone, of which the following is a specification.

Our invention relates to artificial-stone compositions; and its object is to provide a composition of comparatively cheap materials, easily prepared, and when converted into stone of great density and durability.

More particularly is it an object to provide an artificial stone that will withstand sudden and extreme changes of temperature.

Many artificial stones have been used for ornamental work which, if exposed to the humidity of the atmosphere, absorb moisture and then disintegrate. The composition hereinafter described may after it becomes set be immersed in boiling water for hours and then plunged into ice-cold water without affecting it in any manner. To attain these objects, we take a certain quantity of oxide of magnesium and chloride of magnesium and stir together until the resultant cement forms a plastic paste. The oxide of magnesium or calcined magnesia we obtain by burning pure magnesite in kilns, or preferably in iron or clay retorts, at such a temperature and length of time as will expel all carbonic acid from the crude material. Magnesia containing a noticeable quantity of lime should not be used. The calcined magnesia thus obtained is then ground to an impalpable powder.

To obtain chloride of magnesium containing no sulphuric-acid salts and free acids, we take hydrochloric acid of 1.16 specific gravity and gradually add such an amount of calcined magnesium that the resulting chloride of magnesium will be perfectly neutral, as indicated by a litmus-paper test. It is then a yellow oily liquid of 34° Baumé and can be stored in iron drums. This, it will be noted, is very different from the magnesium-chloride salt of commerce, which is generally dissolved in water for the production of a cement. The commercial magnesium-chloride salt contains sulphuric-acid salts and free acids, which, as is well known, do not resist the influence of the elements, and as they also absorb carbonic acid from the air such salts render the produced stone material liable to cracks and final disintegration.

To obtain a perfectly-basic cement, we add the neutral magnesium chloride, obtained as above described, to a certain quantity of calcined magnesia and stir the mixture until the cement is plastic. For one hundred pounds of calcined magnesia we take seven to nine gallons magnesium chloride. This cement is dense and waterproof in itself, but is not sufficiently elastic and tenacious to withstand extreme changes of temperature. Therefore to obtain the required elasticity and tenacity we gradually add to the cement a certain proportion of pure sand (or analogous filling material) and asphaltum (one-tenth per cent. to five-tenths per cent. asphaltum, by weight) treated with a suitable volatile solvent. Instead of sand, ground slate, sandstone, or flint-powder may be used as the filling material, according to the application desired. The heat generated by the crystallizing process of the oxychloride drives off the asphaltum solvent and leaves the stone perfectly and uniformly impregnated with the asphaltum. The amount of asphaltum used will be a minimum in tiles, slabs, &c., and will reach the maximum in such articles as are subjected to extreme changes of temperature, such as wash-tubs and bath-tubs. The asphaltum, in combination with the sand filling material, renders the whole mass so tenacious and heat-conducting that it will permit a considerable expansion and contraction without affecting the integrity of the material. The cement will bind twenty parts of dry sand without losing its semi-liquid state, so that the mixture can be readily poured into molds of any shape. It may also be obtained sufficiently thin to flow from a brush, and thus form a paint, or it may be made stiff enough for troweling, such as plaster-work. Suitable mineral colors may also be introduced. The elimination of the chloride of magnesium takes place gradually and imperceptibly when exposed to the atmosphere, and we eventually obtain a basic stone consisting of pure magnesium hydrate, sand, and asphaltum.

Stones such as tiles, &c., are dried in a room of ordinary temperature. It is sometimes expedient for articles exposed to the atmosphere to have the magnesium chloride eliminated rapidly. This we do by taking the stone after it is set and well dried out and subject it to a hot-water bath and then dry it again. Articles made under pressure—such as standard-size bricks—we subject to a steam bath under eight to ten atmosphere pressures. This very quickly eliminates the chloride, and the bricks are dried again in the ordinary temperature.

Having thus described our invention, what we claim is—

1. A composition of matter for the manufacture of artificial stone, which consists of a basic cement of oxide of magnesium and neutral chloride of magnesium, asphaltum, and sand or analogous material.

2. The process of manufacturing artificial stone, which consists in first obtaining a basic cement of oxide and neutral chloride of magnesium, then adding sand and asphaltum, then drying the resultant stone, and then subjecting such stone to a hot-water bath to drive off the chloride.

In testimony whereof we have hereunto set our hands and seals this 27th day of April, 1892.

JOSEPH E. KESELING. [L. S.]
CHARLES FUCHS, JR. [L. S.]

In presence of—
CHAS. A. RILEY,
WILLIAM MOLLOY.